United States Patent [19]

Nix et al.

[11] Patent Number: 4,516,748
[45] Date of Patent: May 14, 1985

[54] QUICK CONNECT CYLINDER MOUNT STUCTURE

[75] Inventors: Richard Nix, Utica; David J. Compton, Troy, both of Mich.

[73] Assignee: Automotive Products, plc, Leamington Spa, England

[21] Appl. No.: 387,017

[22] Filed: Jun. 10, 1982

[51] Int. Cl.³ .................................. A47G 29/00
[52] U.S. Cl. .............................. 248/1; 192/115
[58] Field of Search ............ 248/1, 56, 73, 27.3; 24/543, 563, 532, 545; 74/501 R, 501.5 R; 285/192, 205; 192/115

[56] References Cited

U.S. PATENT DOCUMENTS

| | | | |
|---|---|---|---|
| 1,875,209 | 8/1932 | Baldwin | 285/205 X |
| 1,942,273 | 1/1934 | Bosworth et al. | 285/205 X |
| 2,078,453 | 4/1937 | Miller | 248/56 |
| 2,284,222 | 5/1942 | Miller | 285/205 X |
| 2,365,785 | 12/1944 | Tinnerman | 285/192 X |
| 2,697,862 | 12/1954 | Flora | 248/56 |
| 3,221,572 | 12/1965 | Swick | 248/56 |
| 3,788,438 | 1/1974 | Reno | 74/501.5 R |
| 3,995,512 | 12/1976 | Johnsen | 74/501 R |
| 4,263,998 | 4/1981 | Moriya | 192/110 R |
| 4,379,536 | 4/1983 | Mizuno | 248/73 |

FOREIGN PATENT DOCUMENTS 1308899  10/1962  France .................. 285/192

*Primary Examiner*—J. Franklin Foss
*Attorney, Agent, or Firm*—Hauke and Patalidis

[57] ABSTRACT

A structure for rapid coupling of a housing, such as the housing of a hydraulic cylinder, to a bifurcated support member simply by pushing the housing between the bifurcated portions of the support member. The housing is provided with a generally U-shaped mounting clip having springingly spreadable legs provided each with an abutment engaging a corresponding abutment on each of the bifurcated portions of the support member. As the clip-provided housing is pushed between the bifurcated portions of the support member, the clip legs spread sufficiently to permit passage of each of the bifurcated portions of the support member and, once the housing is properly seated and located, the clip legs snap back to their original position engaging their abutment with the abutment provided on the bifurcated portions of the support member. The mounting snap-on arrangement defines a one-way interlock securely holding the housing in position and permitting removal of the housing from its mounting support only by prying the clip legs away from the bifurcated portions of the support member.

5 Claims, 6 Drawing Figures

QUICK CONNECT CYLINDER MOUNT STUCTURE

BACKGROUND OF THE INVENTION

The present invention relates to hydraulic cylinder apparatus in general and more particularly to a structure for mounting the housing of a hydraulic cylinder or other actuator on a support member.

The invention relates more specifically to apparatus such as hydraulic actuator apparatus capable of operating a mechanism at a remote location by way of, for example, a master cylinder connected to a slave cylinder installed at the remote location, a flexible conduit interconnecting the master cylinder and the slave cylinder. It is known to provide such hydraulic actuator apparatus for actuating, for example, the release mechanism of a friction clutch. In British patent specification No. 1,539,879, and in co-pending application for U.S. Pat. Ser. No. 344,495, filed Feb. 1, 1982, now U.S. Pat. No. 4,454,632 issued June 19, 1984 there are disclosed preassembled friction clutch hydraulic control apparatus which are prefilled with hydraulic fluid prior to shipment to a motor vehicle manufacturer for installation on a motor vehicle.

For the purpose of installing such apparatus on the motor vehicle, both the master cylinder and the slave cylinder are provided with a mounting flange integrally cast or molded with the cylinder housing and disposed peripherally to the cylinder housing. The mounting flange has mounting apertures, or is provided with ears or lugs having mounting apertures, for installation of the cylinder on a support plate or panel, or on a support bracket. The master cylinder is generally installed by being mounted in an aperture in a bulkhead, such as the vehicle floorboard, with an end of the cylinder housing projecting on one side of the bulkhead and the other end of the housing projecting on the other side of the bulkhead. The bulkhead is provided with an opening through which the cylinder housing is passed. The bulkhead is also provided with a plurality of mounting holes disposed around the periphery of the opening, and the mounting holes in the flange of the cylinder housing, or in the mounting lugs, must be aligned with the mounting holes in the bulkhead or floorboard, and the cylinder housing securely attached in position by means of appropriate bolts or other fasteners passed through the aligned mounting holes. Similarly, the slave cylinder is generally supported through an opening in the clutch housing itself, or on a lug or bracket attached to the clutch housing or integrally cast with the clutch housing. The slave cylinder housing is attached in position by way of bolts passed through aligned mounting holes in the clutch housing or bracket and in the cylinder housing mounting flange or lugs.

Other mounting arrangements for master and slave cylinders have been developed in the past for simplifying the installation of such hydraulic apparatus on the assembly line of a motor vehicle manufacturer, as disclosed for example in the aforesaid British patent specification, in the form of a snap ring retainer for the slave cylinder and of a push-and-rotate fastening arrangement for the master cylinder.

SUMMARY OF THE INVENTION

The principal object of the present invention is to provide a simple, fast and foolproof mount structure for a cylindrical housing, such as the housing of a hydraulic apparatus, on a support member, requiring no tool or conventional fasteners for mounting the housing in position, and requiring simply introduction of the housing between a pair of supporting lugs, the connection between the housing and the supporting lugs being effected by a spring clip installed over the housing and having locking means co-operating with complementary locking means on the supporting lugs.

These and other objects and advantages of the present invention will become apparent to those skilled in art when the following description of the best mode contemplated for practicing the invention is read in conjunction with the accompanying drawing wherein:

DETAILED DESCRIPTION OF THE PREFERRED EMBODIMENT

Figure 1:
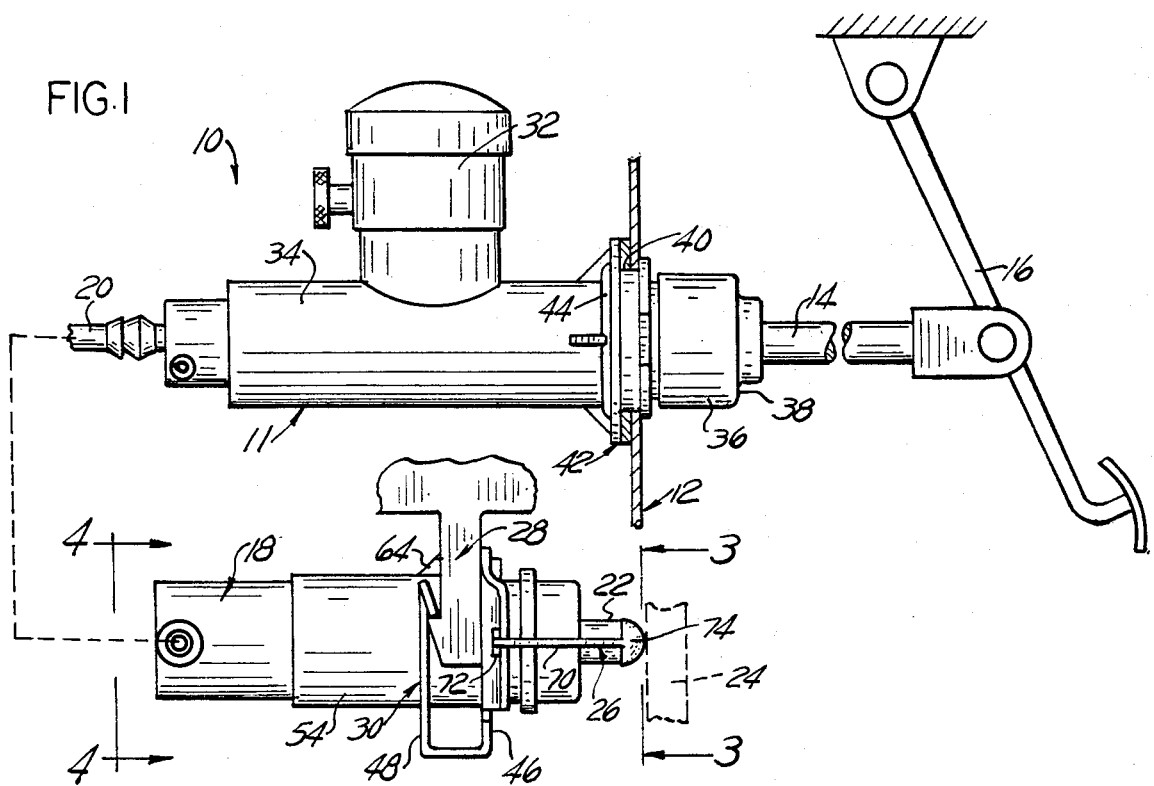
FIG. 1 represents a hydraulic apparatus in the form of a friction clutch hydraulic release apparatus provided with an example of structure according to the present invention for mounting the slave cylinder in an operative position.

Referring to the drawing, and more particularly to FIG. 1, there is illustrated a hydraulic apparatus 10 in the exemplary form of a master cylinder 11 mounted in the bulkhead 12 of a motor vehicle. The master cylinder 11 has an input piston rod 14 mechanically and pivotally connected to a clutch release pedal arm 16 for actuation by the motor vehicle driver. The master cylinder 11 is connected to a slave cylinder 18 by an appropriate conduit, preferably in the form of a flexible hose 20. The slave cylinder 18 is mounted in an appropriate position on, or proximate to, the motor vehicle clutch housing in such manner that its output rod 22 operates the clutch release mechanism, such as a clutch release lever 24. In the example of structure illustrated, the output rod 22 of the slave cylinder 18 is restrained during shipment of the hydraulic apparatus 10 to the motor vehicle manufacturer, and during installation of the apparatus on the motor vehicle on the assembly line, by a break-away retaining strap 26 of the type, for example, disclosed in co-pending application Ser. No. 344,495, filed Feb. 1, 1982, and assigned to the same assignee as the present application. The slave cylinder 18 is mounted on a bracket or support member 28, integrally cast with the clutch or gear box housing, by means of a quick-mount resilient clip 30 as described hereinafter in further details.

Prior to shipment to the motor vehicle manufacturer, the clutch release hydraulic apparatus 10 is assembled as a complete unit including the flexible hose 20 interconnecting the master cylinder 11 and the slave cylinder 18, and the slave cylinder output rod retaining strap 26. The pre-assembled apparatus 10 is installed as a readyto-function unit on the motor vehicle on the assembly line. Prior to shipment, the hydraulic apparatus 10 is filled with hydraulic fluid.

Both the housing of the slave cylinder 18 and the housing of the master cylinder 11 may be cast of metal or, preferably, they are molded of plastic.

The master cylinder 11 is installed through the motor vehicle bulkhead or floorboard 12, with the end portion 36 of its housing from which projects the input rod 14 disposed within the driver's compartment. The bulkhead 12 is provided with an appropriately shaped opening 40, and the housing of the master cylinder 11 is provided with a "twist and lock" mount, generally designated at 42, for simple and rapid installation of the master cylinder 11 through the opening 40 in the bulkhead 12, without tool or conventional fasteners such as bolts or screws. The "twist and lock" mount 42 is disclosed in details in application Ser. No. 387,019 filed contemporaneously herewith.

Referring again to FIG. 1 of the drawing in general, and more particularly to FIGS. 2-6, the quick-mount clip 30 for the slave cylinder 18 is in the form of a generally U-shaped bracket having a wall forming a frontal plate portion 46 and another wall forming a pair of spring legs 48 extending generally parallel to each other and parallel to the plane of the frontal plate 46. The frontal plate 46 has a generally circular opening 50 accepting therethrough a slightly enlarged collar portion 52 molded integrally with the housing 54 of the slave cylinder 18. The housing 54 has an integrally molded generally annular flange 56 for abutment against the marginal surface at the edge of the opening 50 in the frontal plate 46, and thus preventing rearward longitudinal displacement of the cylinder housing 54 relative to the mounting clip 30. The opening 50 has a cut-out portion 58 through which projects a lug 60 molded integrally with, and projecting rearwardly from, the flange 56. The opening 50 further has a second cut-out portion in the form of a radial slot 62, to facilitate assembly of the housing 54 of the slave cylinder 18 through the clip 30. The radial slot 62 provides clearance for passage of a dorsal lug 64 formed integrally projecting from the slave cylinder housing 54 when the housing is passed through the opening 50 in the frontal plate 46 of the clip 30, during assembly of the clip 30 around the cylinder housing 54, the cylinder housing 54 being introduced rearwardly through the opening 50, and rotated about 180° along its longitudinal axis with respect to the position shown in the drawing to allow the dorsal lug 64 to pass through the clearance slot 62. The housing 54 is subsequently rotated approximately 180° about its longitudinal axis relative to the clip 30 to permit introducing the flange lug 60 into the cut-out portion 58 of the opening 50 in the clip frontal plate 46.

Figure 2:
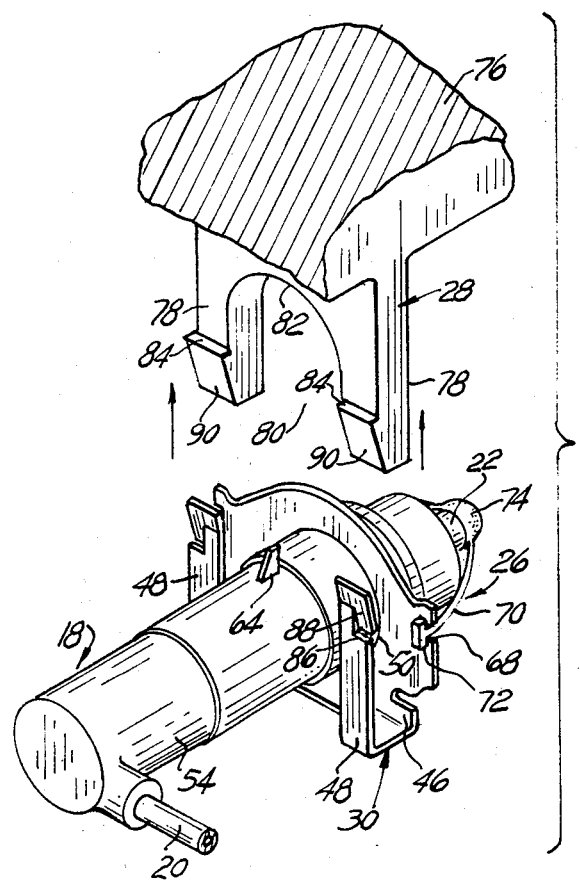
FIG. 2 is an exploded perspective view showing the slave cylinder and the support lug for the slave cylinder prior to mounting the cylinder on the support lugs.
Figure 3:
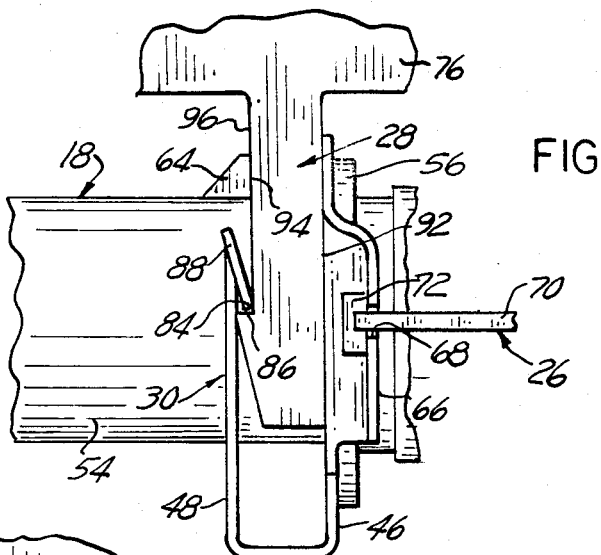
FIG. 3 is a view of a portion of the apparatus of FIG. 1 showing, in more details, the mounting structure of the slave cylinder.
Figure 4:
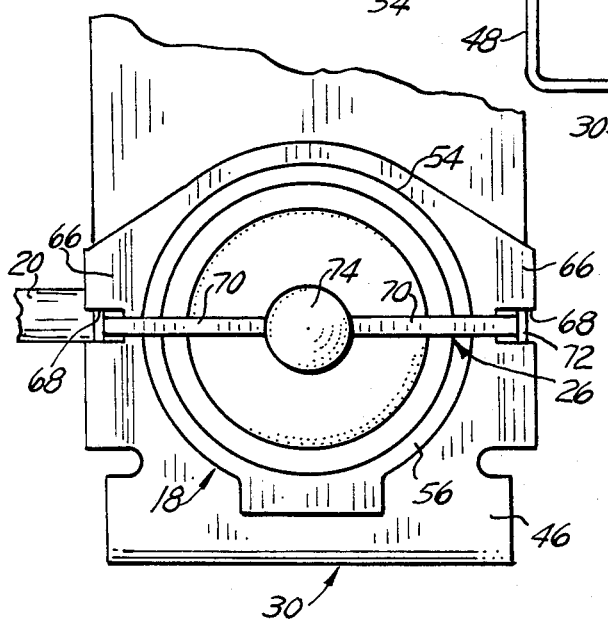
FIG. 4 is a front elevation view from line 4—4 of FIG. 1.
Figure 5:
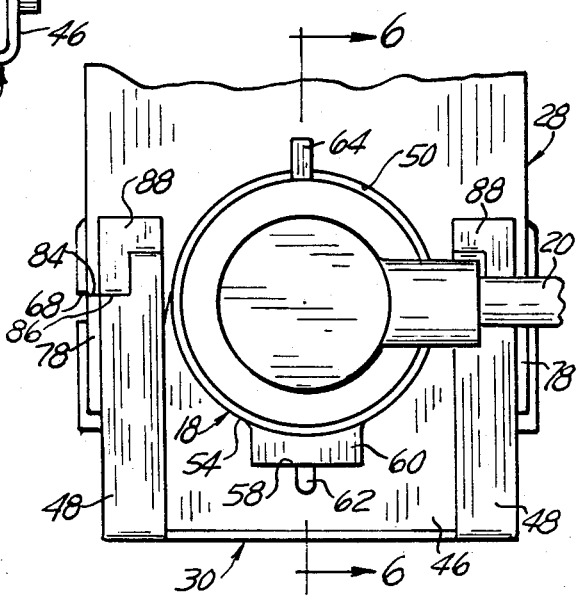
FIG. 5 is a rear elevation view from line 5—5 of FIG. 1.
Figure 6:
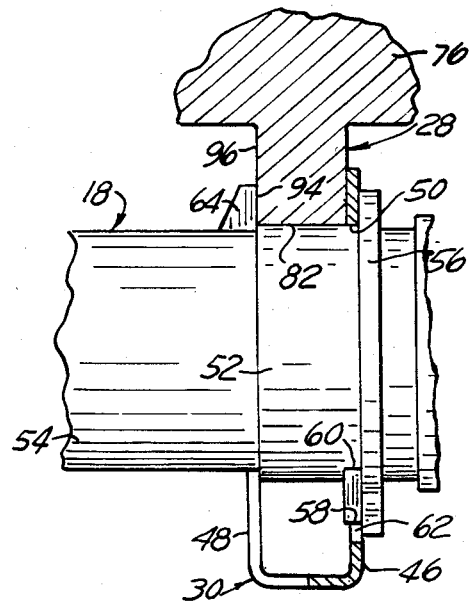
FIG. 6 is a partial sectional view as seen from line 6—6 of FIG. 5.

The frontal plate 46 has a pair of lateral ears 66, each having a slot 68 permitting passing the end of the strips 70 of the output rod restraining strap 26 for hooking the strut 72 at the end of each strip 70 behind an ear 66, after placing the nose cup 74 of the strap 26 over the end of the output rod 22, FIGS. 1 and 2. It will be appreciated that, after the cylinder housing 54 and the clip 30 are properly attached to each other as a sub-assembly, FIG. 2, the strap 26 accomplishes the double purpose of preventing the output rod 22 from accidentally extending from its retracted position, and holding the clip 30 in position around the housing 54 as a result of preventing the frontal plate 46 from being displaced rearwardly, thus disengaging the flange lug 60 from the cut-out portion 58 of the frontal plate opening 50.

During installation of the slave cylinder 18 in an appropriate position on, for example, the clutch housing 76 of a motor vehicle such that the end of the cylinder output rod 22 is properly located to actuate the clutch release mechanism 24, the slave cylinder 18 is simply manually pushed over the mounting bracket 28 formed integral with the clutch housing 76. The mounting bracket 28 is bifurcated such as to define a pair of parallel lug members 78 separated by a slot 80 of a width sufficient to accommodate between the lug members 78 the enlarged diameter portion 52 of the cylinder housing 54. The bottom of the slot 80 may be straight, but preferably it is semi-circular as shown at 82, such as to permit a portion of the peripheral surface of the enlarged diameter portion 52 of the housing 54 to nest in the semi-circular top 82 of the slot 80, when the clip 30 is fully inserted over the lug members 78. The lug members 78 are provided with a stepped surface 84 springingly engaged by the tip 86 of a bent-over wing 88 formed on the end of each spring leg 48 of the clip 30. Due to the inclination of the wings 88, and the spring-like action of the spring legs 48, when the clip 30 attached to the cylinder housing 54 is pressed over the lug members 78 and the spring legs 48 snap back into their original position, the one-way interference between the tip 86 of the wings 88 and the stepped surface 84 of the lug members prevents removal of the slave cylinder 18 from its installed position, unless the spring legs 48 are pried back such as to free the tips 86 of the wings 84 from engagement with the lug member stepped surface 84. Preferably, the lug members 78 have a tapered surface 90 to facilitate spreading of the spring legs 48 away from the frontal plate 46 of the clip 30 during installation of the slave cylinder 18 on the motor vehicle. The opposite face 92 of the lug members 78 has a flat surface in engagement with the corresponding surface of the clip frontal plate 46, and the housing dorsal lug 64 has a leading edge 94 engaging the surface 96 of the bifurcated mounting bracket 28 above the semi-circular top 82 of the slot 80, to hold the housing 54 steady and prevent accidental forward motion of the housing. It is immediately apparent that, during operation of the clutch release mechanism 24, any reaction force is applied to the lug members 78 through the housing flange 56 and the frontal plate 46 of the clip 30, and that the housing dorsal lug 64 has for its sole function to maintain the longitudinal axis of the cylinder housing 54 properly oriented and to prevent tipping of the housing 54 relative to the clip 30. It will be further appreciated that, upon first operation of the clutch release mechanism 24 by the apparatus 10, the strips 70 of the restraining strap 26 break at their weakened break-away sections, preferably disposed at the junction of the strips 70 with the cup 74, such as to free the actuator rod 22 for adequate reciprocation for operating the clutch release mechanism 24.

It will be appreciated by those skilled in the art that the clip-on mounting structure of the invention may be used for attaching a variety of mechanical or electrical components to a supporting member, although the invention has been disclosed in the form of an example of structure particularly well adapted for rapid installation of the slave cylinder of a clutch release hydraulic apparatus, without the use of special tools and without conventional fasteners such as mounting screws or bolts. This results in considerable time saving during installation of components on motor vehicles on the assembly line.

Having thus described the present invention, modifications whereof will be apparent to those skilled in the art, what is claimed as new is as follows:

1. A mounting structure for coupling a housing to a support member, said support member comprising a bifurcated portion having a pair of substantially spaced apart lug members, said structure comprising a generally U-shaped clip member having a frontal wall and a pair of springingly deflectable legs spaced apart from said frontal wall and extending substantially parallel thereto, and opening in said frontal wall encircling said housing, a step-like abutment on each of said lug members, corresponding abutment means on each of said deflectable legs of said clip, and inclined surface means springingly causing deflection of said clip legs for passage over said step-like abutment on each said lug members during introduction of said clip over said lug members, whereby when said clip is introduced over said lug members said legs are springingly deflected and snap back to a position causing said step-like abutment on each of said leg members to form with said abutment means on each of said legs a one-way interference preventing removal of said clip from over said lug members.

2. The structure of claim 1 further comprising a cut-out portion in said opening and a lug in said housing fitting said cut-out portion for preventing rotation of said housing relative to said clip around the longitudinal axis of said housing.

3. The structure of claim 1 further comprising a flange on said housing for engagement with said frontal wall, and abutment means on said housing for engagement with a surface area of said support member, said flange and said abutment means preventing longitudinal displacement of said housing.

4. The structure of claim 3 wherein said abutment means is in the form of a dorsal lug on said housing having an edge engaged with said surface area of said support member.

5. The structure of claim 1 wherein said housing is the housing of the hydraulic actuator comprising an output member linearly displaceable relative to said housing, a break-away retaining strap for said output member and means for attaching said retaining strap to said frontal wall of said clip.

* * * * *

UNITED STATES PATENT AND TRADEMARK OFFICE
CERTIFICATE OF CORRECTION

PATENT NO. : 4,516,748
DATED : May 14, 1985
INVENTOR(S) : Richard Nix et al

It is certified that error appears in the above-identified patent and that said Letters Patent are hereby corrected as shown below:

Col. 4, line 31, change "84" to --88--.

In FIG. 1, cancel reference numerals "32", "34", "38" and "44" and change the viewline "4-4" to --5-5-- and the viewline "3-3" to --4-4--.

Signed and Sealed this

Fifteenth Day of October 1985

[SEAL]

Attest:

DONALD J. QUIGG

Attesting Officer

Commissioner of Patents and
Trademarks—Designate